No. 726,002. PATENTED APR. 21, 1903.
R. H. SMITH.
INSCRIBER.
APPLICATION FILED JULY 9, 1902.
NO MODEL. 2 SHEETS—SHEET 2.
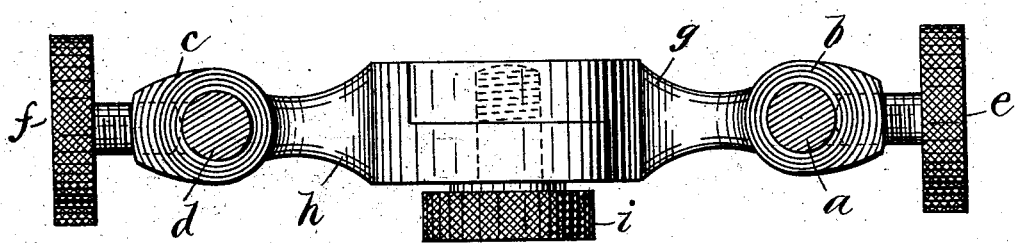
Fig. III
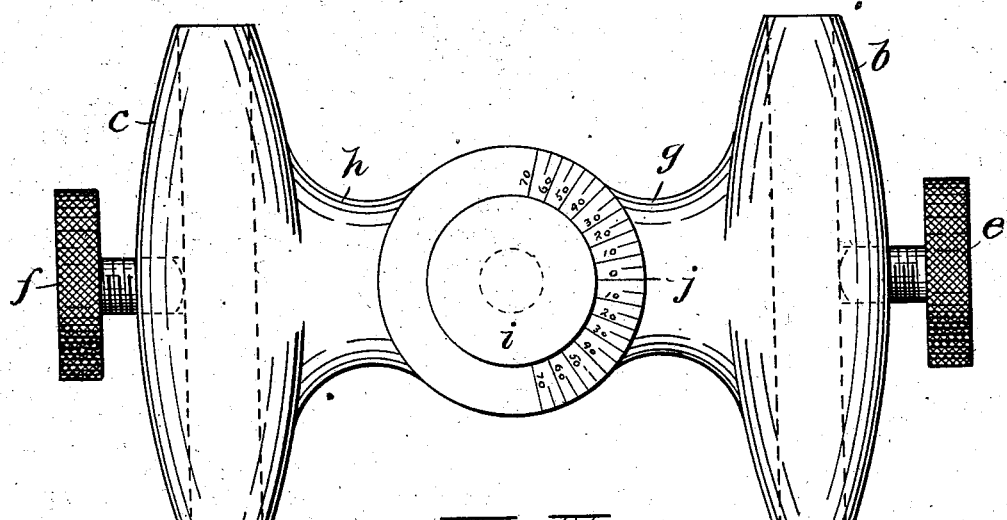
Fig. IV
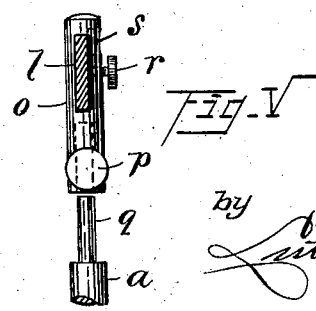
Fig. V
Witnesses:
F. Griswold.
Thos. F. Strauss
Inventor
Roy H. Smith,
by Luther L. Hopper,
Attorney.

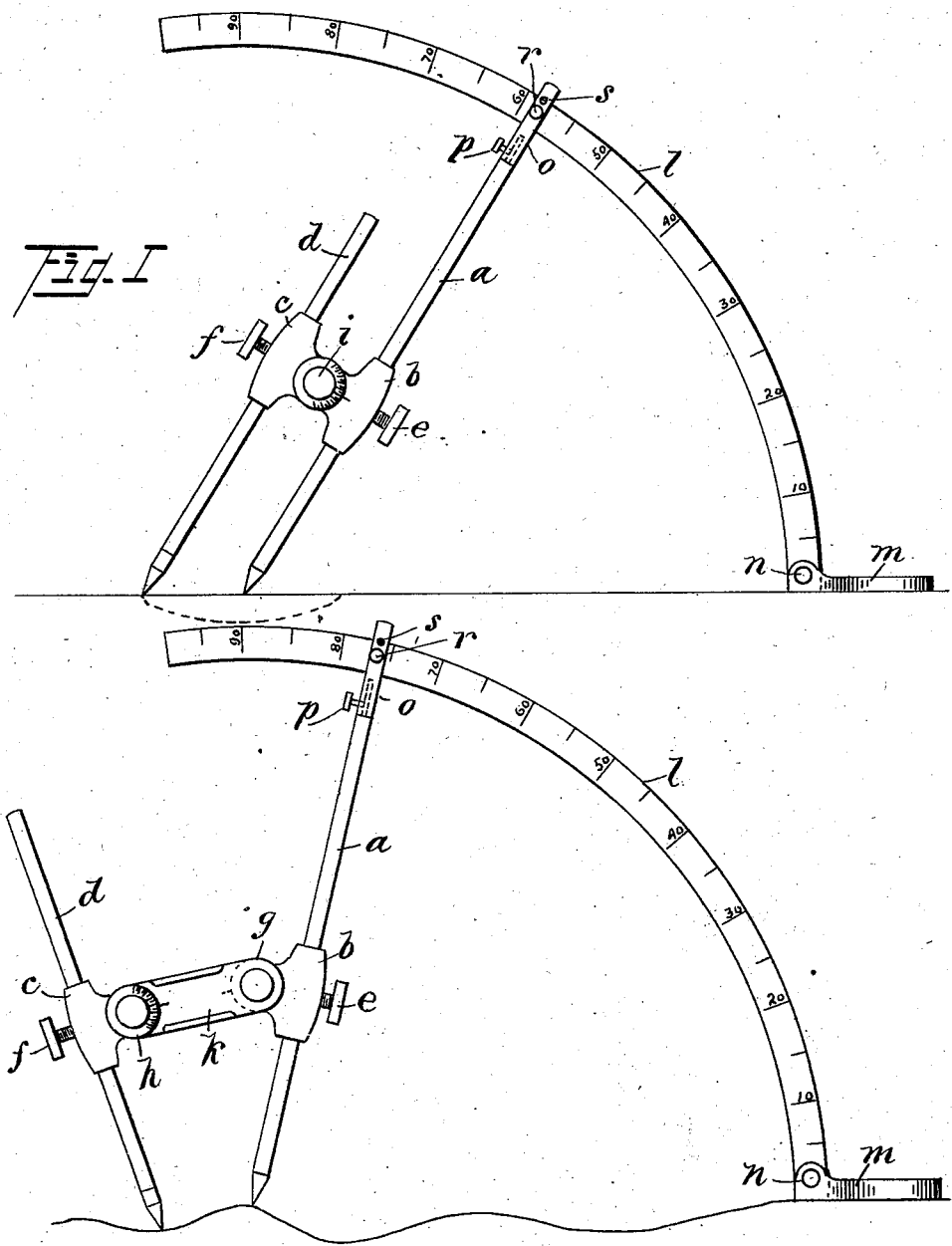

UNITED STATES PATENT OFFICE.

ROY H. SMITH, OF RIALTO, CALIFORNIA, ASSIGNOR OF ONE-HALF TO GUY S. DYER, OF ALVARADO, CALIFORNIA.

INSCRIBER.

SPECIFICATION forming part of Letters Patent No. 726,002, dated April 21, 1903.

Application filed July 9, 1902. Serial No. 114,862. (No model.)

*To all whom it may concern:*

Be it known that I, ROY H. SMITH, a citizen of the United States, residing at Rialto, in the county of San Bernardino and State of California, have invented certain new and useful Improvements in Inscribers, of which the following is a specification.

This invention relates to instruments for drawing or marking regular curved lines, and has for its object the provision of apparatus adapted to be used for drawing or inscribing a circle or an ellipse upon a plane surface and which may also be employed to inscribe a line upon any curved or irregular surface, such as would be made by the intersection at any angle of a cylinder or a cone with said surface. Further objects are to provide means for adjusting and holding the instrument in the precise position desired and for setting the marking-point in its proper position in relation to the pivotal point of the instrument.

Minor objects will become apparent from the description.

To these ends my invention consists in the novel features and combinations hereinafter described and claimed, an embodiment thereof being illustrated in the accompanying drawings, in which—

Figure I is a side view of the inscriber adjusted to draw an elliptical curve upon a plane surface. Fig. II is a side elevation of the instrument set for drawing such a line upon an irregular surface as would be made by the intersection of a cone with said surface. Fig. III is a plan view, and Fig. IV is a side elevation, of the jointed arms of the device. Fig. V is a side view of the upper end of the pivotal rod $a$.

The reference-letter $a$ indicates a pivotal rod having a circular cross-section of unvarying diameter and provided at its lower end with a suitable point. A sleeve $b$ is fitted closely to said rod, but adapted to slide readily thereon. A similar sleeve $c$ carries a scribing-rod $d$, which is also accurately sized to a close sliding fit in its sleeve. The said sleeves are provided with clamping-screws, as shown at $e$ and $f$, by means of which they may be fastened rigidly to their respective rods. Projecting laterally from the respective sleeves $b$ and $c$ are brackets $g$ and $h$, having their extremities offset, flattened, and rounded, so as to fit together and form, together with a clamping-screw $i$, a hinge-joint, as plainly shown in Figs. III and IV. The outer faces of the hinge-limbs of said brackets may be graduated around the outer portions of their peripheries for the purpose of indicating the angle of the rods $a$ and $d$ in relation to each other, according as said graduated lines register, respectively, with marks, such as $j$, Fig. IV, upon the other hinge members. When it is desired to spread the rods $a$ and $d$ farther apart, a distance-piece or link $k$, together with an additional clamping-screw, such as $i$, may be employed, as shown in Fig. II. The ends of these distance-pieces should be made similar in all respects, save the graduations, to the hinge-limbs of the brackets $g$ and $h$ and should be provided with registering marks similar to that shown at $j$.

For the purpose of setting and supporting the pivotal rod $a$ at any angle which may be desired I employ a circular brace or protractor-arm $l$, clamped at its lower end to a suitable base-plate $m$ by a thumb-screw $n$ or other suitable means. The periphery of the protractor should be graduated, as shown, to indicate angles up to ninety degrees at least, so that the rod $a$ can be set either vertically or inclined at any desired angle.

In order to permit of the rod $a$ turning upon its point in certain operations and also for adjusting its length when required, a telescoping or pin-and-socket joint is formed in its upper end, as plainly shown in Fig. V, the socket being formed in the extension $o$ of the rod, and a set-screw $p$ being tapped therein, so as to clamp the reduced end $q$ of the rod $a$ in the said socket. A slot is made in the extension $o$ to receive the protractor $l$, and a screw $r$ is provided to clamp the rod to the protractor. An opening $s$ may be made in one side of the rod through which the graduated lines upon the protractor may be seen.

In operating the device to draw a circle upon a plane surface the pivotal rod $a$ is held perpendicular to the surface either by the protractor $l$ or by hand, and the scribing-rod $d$ is swung around it, as in the case of an ordinary compass. To draw an ellipse upon a plane surface, the pivotal rod is inclined to the requisite angle, as in Fig. I, and may be held in position by being clamped to the protractor. The points being set the proper distance apart, the screw $i$ is then tightened. The screw $f$ may be tightened and the screw $e$ loosened, so that the sleeve $b$ is free to slide upon the rod $a$, or, if preferred, the screw $e$ may be tightened and the screws $f$ and $p$ loosened, in which case the rod $a$ will be rotated with the sleeves, and the rod $d$ will slide through the sleeve $c$.

In operating upon a curved or irregular surface, as in Fig. II, the rod $a$ will represent the position of the axis of either a cylinder or a cone which intersects said surface, and the axis of the rod $d$ will lie in the surface of such cylinder or cone. If the screw $e$ is loosened and the screw $f$ tightened, the instrument will describe a line representing the intersection of a cylinder with the surface upon which the line is drawn whatever the angle may be between either rod and the said surface; but by tightening the screw $e$, loosening the screw $f$, and also loosening the screw $p$, if the protractor is employed, and setting the rod $d$ at an angle to the rod $a$, the scribing-point will follow the surface operated upon, so as to outline the intersection of a cone with said surface. The angle between the slant height and the axis of the cone required is found upon the graduated joint and set to register with the mark $j$. The approximate angle between the surface operated upon and the axis of a cone or cylinder, as the case may be, is found upon the protractor $l$.

Various well-known scribing and center points may be employed and other modifications may be made in the details of the device provided the principles of construction set forth respectively in the following claims are employed.

I therefore particularly point out and claim as my invention—

1. The combination of a pivotal rod having a suitable point at its lower end, a scribing-rod provided with a point adapted for marking a line, sleeves adapted to slide and rotate one upon each of the said rods respectively and each provided with means for clamping them thereon, a laterally-projecting arm upon each sleeve, said arms being hinged together so as to be movable in a plane coincident with or parallel to the axes of the said rods, and means for clamping the said hinge-joint, substantially as set forth.

2. The combination of a pivotal rod having a suitable point at its lower end, a scribing-rod provided with a point adapted for marking a line, sleeves adapted to slide and rotate one upon each of the said rods respectively and each provided with means for clamping them thereon, a laterally-projecting arm upon each sleeve, said arms having their ends flattened, rounded and hinged together so as to be movable in a plane coincident with or parallel to the axes of the said rods, means for clamping the said hinge-joint, and graduated lines upon said hinge-joint adapted to indicate the angular inclination of the said rods relatively to each other, substantially as set forth.

3. The combination of a pivotal rod having a suitable point at its lower end, a scribing-rod provided with a point adapted for marking a line, sleeves adapted to slide and rotate one upon each of the said rods respectively and each provided with means for clamping them thereon, a connecting-link between said sleeves, a laterally-projecting arm upon each sleeve, said arms having their ends flattened, rounded and hinged respectively to opposite ends of said link so as to be movable in a plane coincident with or parallel to the axes of the said rods, means for clamping the said hinge-joints, and graduated lines upon said hinge-joints adapted to indicate the angular inclination of the said rods relatively to each other, substantially as set forth.

4. The combination of a pivotal rod having a suitable point at its lower end, a scribing-rod provided with a point adapted for marking a line, sleeves adapted to slide and rotate one upon each of the said rods respectively and each provided with means for clamping them thereon, a laterally-projecting arm upon each sleeve, said arms being hinged together by a suitable clamping-screw, so as to be movable in a plane coincident with or parallel to the axes of the said rods, an arc-shaped brace supported by a base-plate, and suitable means for clamping the upper end of said pivotal rod to said brace, substantially as and for the purpose set forth.

5. The combination of a pivotal rod having a suitable point at its lower end, a scribing-rod provided with a point adapted for marking a line, sleeves adapted to slide and rotate one upon each of the said rods respectively and each provided with means for clamping them thereon, a laterally-projecting arm upon each sleeve, said arms being hinged together by a clamping-screw, so as to be movable in a plane coincident with or parallel to the axes of the said rods, an arc-shaped brace supported by a suitable base-plate and having graduated lines thereon to indicate angles, and an extension of said pivotal rod adapted to be clamped upon said brace and provided with a socket to receive the upper end of said pivotal rod and means for clamping it thereto, substantially as set forth.

In testimony whereof I affix my signature, in the presence of two subscribing witnesses, at Benton Harbor, Michigan, July 5, 1902.

ROY H. SMITH.

Witnesses:
I. A. NICHOL,
IVA NIECE.